J. SNYDER.
POTATO CUTTER.
APPLICATION FILED SEPT. 27, 1909.
957,118.
Patented May 3, 1910.
2 SHEETS—SHEET 1.
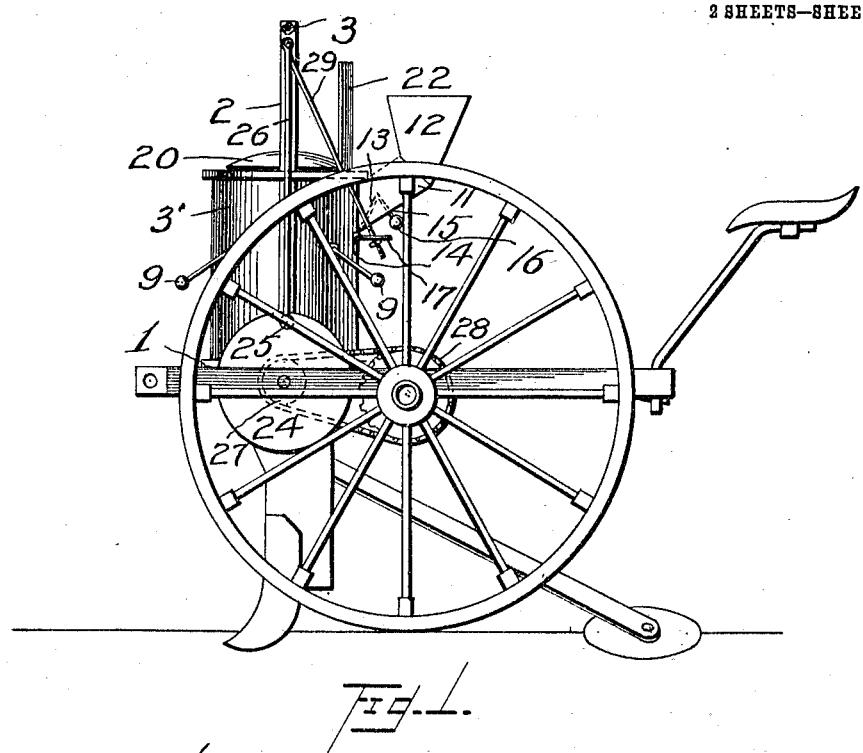
Fig. 1.
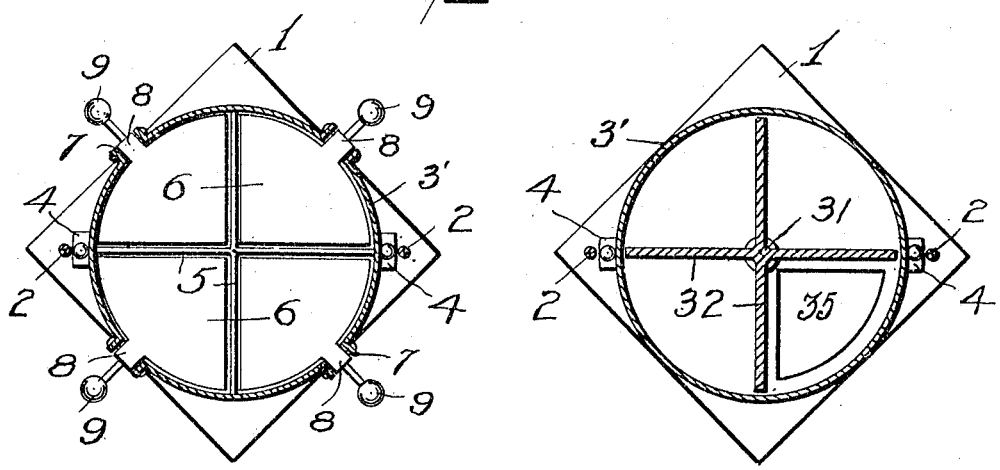
Fig. 4.
Fig. 5.
Witnesses
Inventor
Jerome Snyder
by H. B. Willson & Co.
Attorneys J. SNYDER.
POTATO CUTTER.
APPLICATION FILED SEPT. 27, 1909.
957,118.
Patented May 3, 1910.
2 SHEETS—SHEET 2.
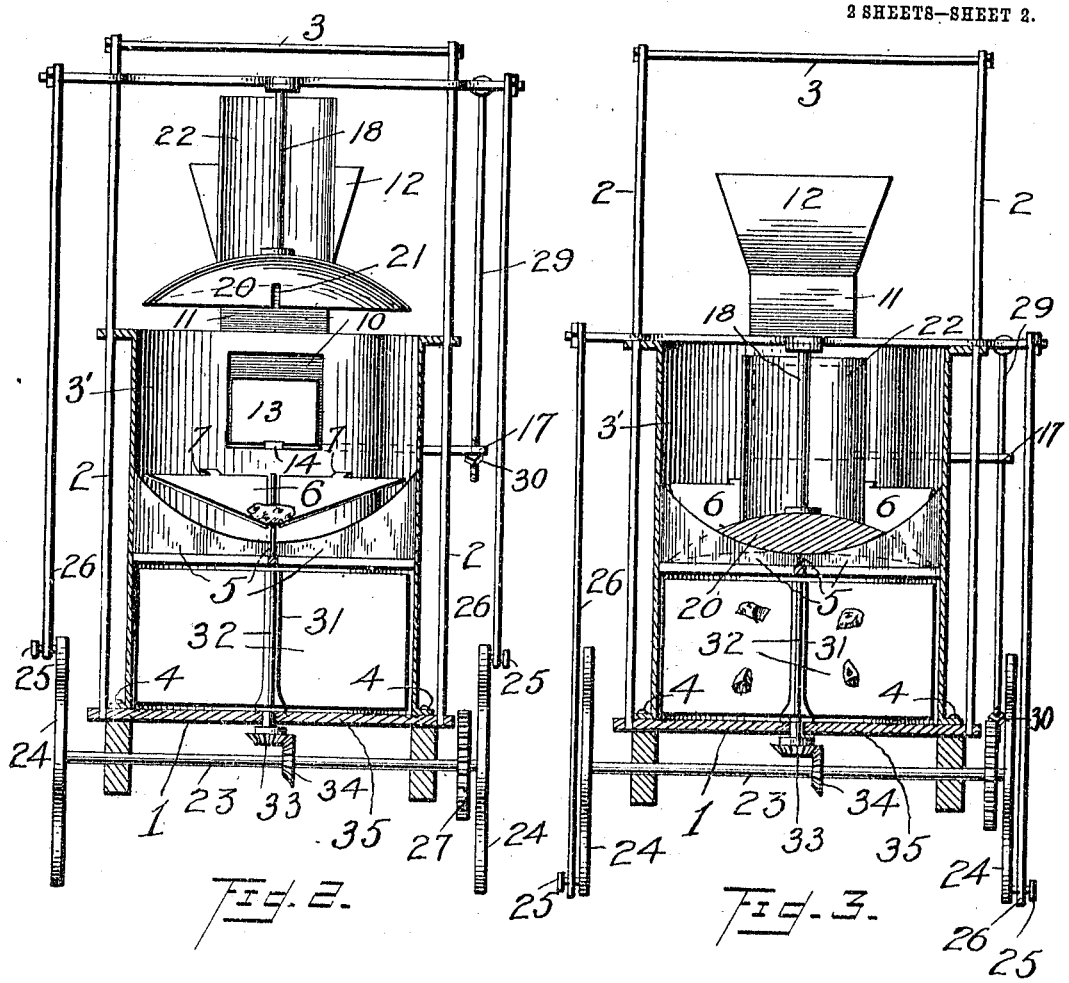
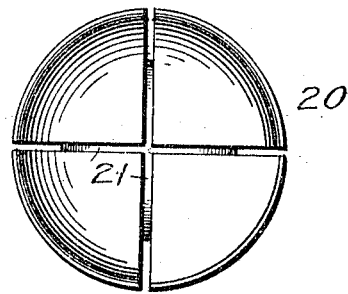
Witnesses
Inventor
Jerome Snyder
by
Attorneys

UNITED STATES PATENT OFFICE.

JEROME SNYDER, OF BARBERTON, OHIO.

POTATO-CUTTER.

957,118. Specification of Letters Patent. Patented May 3, 1910.

Application filed September 27, 1909. Serial No. 519,671.

*To all whom it may concern:*

Be it known that I, JEROME SNYDER, a citizen of the United States, residing at Barberton, in the county of Summit and State of Ohio, have invented certain new and useful Improvements in Potato-Cutters; and I do declare the following to be a full, clear, and exact description of the invention, such as will enable others skilled in the art to which it appertains to make and use the same.

This invention relates to improvements in potato cutters.

One object of the invention is to provide a potato cutter which is particularly adapted for use in connection with my improved potato planter shown in Letters-Patent No. 924,393, of June 8, 1909, but which may be employed in connection with other forms of potato planters or which may be operated independent of any machine.

Another object is to provide a device of this character which will be simple in construction, efficient and reliable in operation and well adapted for the purpose for which it is designed.

With the foregoing and other objects in view, the invention consists of certain novel features of construction, combination and arrangement of parts, as will be more fully described and particularly pointed out in the appended claims.

In the accompanying drawings: Figure 1 is a side view of a potato planter showing the application of the invention thereto. Fig. 2 is a vertical section of the cutter showing the parts in an inoperative position. Fig. 3 is a similar view showing the parts in an operative position. Fig. 4 is a horizontal section taken immediately above the potato supporting doors. Fig. 5 is a similar view taken through the revolving wings. Fig. 6 is a bottom plan view of the plunger employed in connection with the cutter.

In the embodiment of my invention, I provide a supporting frame which is mounted on or secured to a corn planter in any suitable manner and which comprises a base plate 1, and upwardly projecting guide standards 2, which are connected at their upper ends by a cross bar 3. On the base plate 1, between the standards 2, is arranged an upright cylinder 3', which may be constructed of any suitable material and may be provided with an integral bottom or may be secured to the base plate 1, by lugs 4, or any other suitable fastening means. In the construction shown, the cylinder is secured to the base plate 1, which forms the bottom thereof.

Arranged in the cylinder a suitable distance above the lower end thereof are two cutting blades 5, which are arranged at right angles to each other and extend across the cylinder and are secured at their ends to the inner sides of the cylinder in any suitable manner. The upper edges of the blades 5, are preferably formed on a curve as shown. Arranged above the blades 5, are potato supporting doors 6, one of which is disposed above each of the spaces between the blades 5, as shown. The outer edges of the door 6, are formed on a curve corresponding with the curvature of the sides of the cylinder 3, and said curved edges of the doors are hingedly connected to the sides of the cylinder through slots 7, by hinges 8. The door member of the hinges 8, has formed thereon a radially projecting lug which extends a suitable distance beyond the outer side of the cylinder and has connected thereto a depending weight 9, by means of which the doors are closed and held in a closed position after each operation of the cutter.

In one side of the cylinder, above the door 6, is formed an inlet passage 10, for the potatoes. With the passage 10, is connected a feed chute 11, the outer end of which is connected with the hopper 12, which is adapted to contain the potatoes to be cut up. In the chute 11, adjacent to its lower end is arranged a door or gate 13, which consists of a right-angularly formed plate, one end of which is hingedly mounted in the discharge end of the tube as shown at 14, while the opposite end projects and works through a slot 15, formed in the bottom of the chute 11. On the end of the gate which projects through the slot 15, is arranged a weight 16, which operates to open the gate when the holding mechanism of the same is released in the manner hereinafter described. Secured to the pintle or shaft of the hinge 14, which connects the end of the gate with the chute, is an outwardly projecting crank arm 17, in the outer end of which is formed a slot.

Slidably mounted on the standards 2, is a plunger operating bar 18, to which is connected the stem 19, of a plunger 20. The plunger 20, is preferably of circular shape and concavo-convex in form and is adapted to substantially fit within the cylinder 3, in which it is reciprocated. In the plunger 20, are formed diametrically arranged grooves and slots 21, which engage the blades 5, when the plunger is depressed to cut the potato. Secured to the edge of the plunger, adjacent to the feed opening 10 in the side of the cylinder, is a curved cover plate 22, which, when the plunger is depressed, is adapted to move across the feed opening 10 and to close the same while the plunger is in a lowered or operative position.

Mounted in suitable bearings in the lower portion of the supporting frame is an operating shaft 23, on the opposite ends of which are fixedly mounted crank wheels or disks 24, on the outer sides of which are eccentrically arranged wrist pins 25, with which are loosely connected the lower ends of plunger operating rods 26, the upper ends of which are pivotally connected to the outer ends of the plunger operating bar 18. By thus connecting the plunger with the shaft 23, the former will be reciprocated at each revolution of the operating shaft. On the shaft 23, is also mounted a driving gear or pulley 27, which is connected by a drive belt or chain 28, to a suitable driven part of the planter or to any form of operating mechanism.

The gate 13, is held in a closed position to prevent the discharge of the potatoes from the chute 11, by a supporting rod 29, the upper end of which is connected to the plunger operating bar 18. The lower end of the rod 29, projects through the slot in the end of the crank arm 17, of the gate and is threaded to receive an adjusting nut 30, which engages the under side of the crank arm 17, and thereby causes the rod 29, to actuate the crank arm 17, and close the gate 13, when the plunger is elevated. When the plunger is lowered, the rod 22, will be forced downwardly through the slot in the arm 17, thus permitting the weight 16, to pull the gate 13, downwardly to an open position, thus allowing the potatoes to roll out of the chute 11, and into the cylinder 3. When the potatoes thus enter the cylinder they fall upon the doors 6, which are normally closed and incline from four directions from the center of the cylinder and to a point immediately above the engaged or crossed portions of the blades. When a potato is in position, the plunger 20, is lowered until the outer edges of the same come into engagement with the doors 6, which are opened by the further downward movement of the plunger allowing the potato to drop on to the cross blades 5, in which position it is engaged by the plunger upon the further downward movement thereof and forced on to the blades until severed thereby into four parts, which, after being thus severed drop into the lower end of the cylinder. As soon as the potato is cut the plunger retracts or is elevated by the operating mechanism hereinbefore described, thus permitting the weights 9, to close the doors 6. The upward movement of the plunger operating bar 18, when retracting the plunger also actuates the rod 29, to close the gate 13, in the chute 11.

In the center of the lower portion of the cylinder is revolubly mounted a vertically disposed shaft 31, to which are secured radially projecting right angularly disposed blades 32 which divide the lower end of the cylinder into four corresponding compartments. The plates 32, are of such width that their outer edges are in close proximity to the bottom of the cylinder or the base plate 1. The lower end of the shaft 31, projects below the plate 1, and has fixed thereon a beveled gear 33, which is engaged by a similar gear 34, on the operating shaft 23, of the plunger mechanism. In the bottom or base plate 1, is formed a discharge opening 35, through which the quarter sections of the potatoes are discharged when brought around by the blades 32. The sections of the potato, when thus discharged, fall into or are conveyed by a suitable conducting chute into the furrows opened by the planting mechanism of the machine to which the cutter is attached.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a potato cutter, a supporting frame, a cylinder arranged in said frame, said cylinder having a discharge opening, cutting blades arranged in said cylinder, automatically operated potato supporting doors arranged above said blades, a hopper, a feed chute to connect said hopper to said cylinder, a plunger slidably mounted in said cylinder and adapted to force the potatoes discharged therein on to said blades, whereby the potatoes are cut, a plunger operating bar slidably mounted on said frame, a suitably driven operating shaft, crank wheels mounted on said shaft, operating rods to connect said crank wheels with said plunger operating bar, whereby said plunger is reciprocated in said cylinder, a discharging mechanism arranged in said cylinder below said cutting blades, said mechanism comprising a revolubly mounted shaft, radially projecting blades arranged on said shaft and operated thereby to bring the cut potatoes over the discharge opening in said cylinder, and means whereby said shaft is geared to the plunger operating shaft.

2. In a potato cutter, a suitably mounted cylinder, cutting blades arranged therein, a plurality of weight-controlled potato supporting doors arranged in said cylinder above said blades, a potato feeding mechanism, means whereby the potatoes fed into said cylinder are forced into engagement with and cut by said blades and a discharging mechanism arranged in said cylinder beneath said cutting blades, said mechanism comprising a revolubly mounted shaft provided with a plurality of radial projecting wings which divide the lower end of the cylinder into a corresponding number of compartments adapted to receive the sliced pieces of the potatoes, and means to rotate said discharging mechanism.

3. In a potato cutter of the class described, an upright cylinder, a pair of intersecting cutting blades arranged in said cylinder, weight-controlled downwardly inclined potato supporting doors arranged in said cylinder above and adapted to support a potato over the point of intersection of said blades, whereby the potato, when cut, is divided into four parts, a potato feeding mechanism arranged at one side of the cylinder above said doors, a plunger movable in said cylinder and adapted to open said doors to permit the potatoes to fall upon the cutting blades and to subsequently force the potatoes against the cutting blades, a plunger operating mechanism, and means operated by said mechanism to control the feeding of the potatoes to the cylinder.

4. In a potato cutter of the class described, an upright cylinder, cutting knives arranged therein, potato supporting means arranged in the cylinder above said cutting knives, a hopper arranged at one side of the cylinder, a feed chute between the hopper and cylinder, a plunger mounted to move in the cylinder, a plunger operating mechanism, a pivoted weight-controlled door mounted in the lower end of the feed chute to control the passage of the potatoes from the hopper to the cylinder, and means of connection between the plunger operating mechanism and the door, whereby the latter is swung into closed position upon the upward movement of the plunger.

5. In a potato cutter of the class described, an upright cylinder, cutting knives arranged therein, potato supporting means arranged in the cylinder above said cutting knives, a hopper arranged at one side of the cylinder, a feed chute between the hopper and cylinder, a plunger mounted to move in the cylinder, a plunger operating mechanism, a pivoted weight-controlled door mounted in the lower end of the feed chute to control the passage of the potatoes from the hopper to the cylinder, and means of connection between the plunger operating mechanism and the door, whereby the latter is swung into closed position upon the upward movement of the plunger, and a cover plate carried by the plunger and adapted to close the lower end of the feed spout when the plunger is in lowered or operative position.

In testimony whereof I have hereunto set my hand in presence of two subscribing witnesses.

JEROME SNYDER.

Witnesses:
W. A. MORTON,
H. S. LAUGHLIN.